(12) United States Patent
Shute (10) Patent No.: US 12,405,868 B2
(45) Date of Patent: Sep. 2, 2025

(54) METHOD OF USING A MINIMALLY MODIFIED COMPUTER AS LIVE MIGRATION RECIPIENT

(71) Applicant: STRATUS TECHNOLOGIES IRELAND LTD., Dublin (IE)

(72) Inventor: Derek Shute, Ashland, MA (US)

(73) Assignee: STRATUS TECHNOLOGIES IRELAND LTD. (IE)

( * ) Notice: Subject to any disclaimer, the term of this patent is extended or adjusted under 35 U.S.C. 154(b) by 81 days.

(21) Appl. No.: 18/399,453

(22) Filed: Dec. 28, 2023

(65) Prior Publication Data

US 2025/0130906 A1    Apr. 24, 2025

Related U.S. Application Data

(60) Provisional application No. 63/545,153, filed on Oct. 20, 2023.

(51) Int. Cl.
G06F 11/00 (2006.01)
G06F 11/20 (2006.01)

(52) U.S. Cl.
CPC ........ *G06F 11/203* (2013.01); *G06F 11/2023* (2013.01); *G06F 11/2038* (2013.01); *G06F 11/2048* (2013.01)

(58) Field of Classification Search
CPC .............. G06F 11/203; G06F 11/2038; G06F 11/2048; G06F 11/2023
See application file for complete search history.

(56) References Cited

U.S. PATENT DOCUMENTS

| | | | |
|---|---|---|---|
| 6,355,991 B1 | 3/2002 | Goff et al. |
| 6,633,996 B1 | 10/2003 | Suffin et al. |
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |

(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

(Continued)

*Primary Examiner* — Marc Duncan
(74) *Attorney, Agent, or Firm* — K&L GATES LLP (57) ABSTRACT

In part, in one aspect, the disclosure relates to a preparing for a standby compute node for a migration event in a fault tolerant system. The method may include receiving a migration instruction at the standby compute node of the fault tolerant system, the standby compute node includes a processor, a memory and an operating system; initiating a system service on the standby compute node, wherein the system service is configured to start a shutdown or a reboot process of the standby compute node; and quiescing one or more devices in communication with the standby node.

20 Claims, 3 Drawing Sheets

(56) References Cited

U.S. PATENT DOCUMENTS

| | | |
|---|---|---|
| 6,874,102 B2 | 3/2005 | Doody et al. |
| 6,886,171 B2 | 4/2005 | MacLeod |
| 6,928,583 B2 | 8/2005 | Griffin et al. |
| 6,948,010 B2 | 9/2005 | Somers et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 9,971,655 B1* | 5/2018 | Li .................. G06F 11/1438 |
| 10,216,598 B2 | 2/2019 | Haid et al. |
| 10,360,117 B2 | 7/2019 | Haid et al. |
| 11,288,143 B2 | 3/2022 | Horvath et al. |
| 11,586,514 B2 | 2/2023 | Pawlowski et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2006/0294351 A1* | 12/2006 | Rostampour ......... G06F 9/4862 713/1 |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2014/0089393 A1* | 3/2014 | Druet .................. G06F 9/4856 709/203 |
| 2014/0250319 A1* | 9/2014 | Rieschl ............... G06F 11/2028 714/4.11 |
| 2015/0205688 A1 | 7/2015 | Haid et al. |
| 2015/0263983 A1 | 9/2015 | Brennan et al. |
| 2017/0324609 A1 | 11/2017 | Hong et al. |
| 2018/0046480 A1 | 2/2018 | Dong et al. |
| 2018/0143885 A1 | 5/2018 | Dong et al. |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |
| 2023/0185671 A1 | 6/2023 | Pawlowski et al. |
| 2023/0291721 A1 | 9/2023 | Robinson |
| 2024/0176739 A1 | 5/2024 | Alden et al. |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

METHOD OF USING A MINIMALLY MODIFIED COMPUTER AS LIVE MIGRATION RECIPIENT

CROSS REFERENCE TO RELATED APPLICATIONS

This application is a U.S. patent application which claims priority to and the benefit of U.S. Provisional Patent Application No. 63/545,153, filed on Oct. 20, 2023.

FIELD

This disclosure relates generally to the field of field of failover, redundancy, and fault tolerance in computing systems.

BACKGROUND

Contemporary computing systems with high availability requirements make use of resource redundancy and failover mechanisms for various purposes.

SUMMARY

In part, in one aspect, the disclosure relates to a method for preparing a computer as a recipient in a failover process. In one aspect, the method includes a modified shutdown, sleep, power saving, or reboot process.

In part, in one aspect, the disclosure relates to a preparing for a standby compute node for a migration event in a fault tolerant system. The method may include receiving a migration instruction at the standby compute node of the fault tolerant system, the standby compute node includes a processor, a memory and an operating system; initiating a system service on the standby compute node, wherein the system service is configured to start a shutdown or a reboot process of the standby compute node; and quiescing one or more devices in communication with the standby node.

In various embodiments, the method may further include dismounting one or more file systems of the operating system. In some embodiments, the method may further include determining if a migration event was requested. In some embodiments, the method may further include if no migration event was requested, powering off the standby compute node or sending the standby compute node into a sleep state or a power save state. In many embodiments, the method may further include if no migration event was requested, rebooting the standby compute node.

In some embodiments, the operating system includes a platform driver configured to initiate the system service in response to the received migration instruction. In many embodiments, the system service is selected from the group consisting of systemd service; an initrc service; an openrc service, an init service; a Linux-based system service, a Unix-based system service, a Windows-based system service, and a real-time operating system service. In some embodiments, the method may further include if a migration event is determined to have been requested, assigning control of migration process to the platform driver.

In some embodiments, determining if a migration event was requested is performed using a script or other software-based process. In various embodiments, the migration notification or instruction is sent from a failing active compute node of the fault tolerant system. In some embodiments, the method may further include creating a system state wherein file systems are unmounted via a RAM disk. In various embodiments, the RAM disk is configured to remove one or more device drivers or other software components of the standby node before control of migration process at the standby compute node is assigned to the platform driver. In various embodiments, initiating a system service includes issuing a first command to a kernel of the operating system or to a system service manager, wherein the first command is a shut down or reboot command.

In part, in still another aspect, the disclosure relates to a method of preparing for a standby compute node for a migration event in a fault tolerant system. The method may include receiving a migration instruction at the standby compute node of the fault tolerant system, the standby compute node comprising a processor, a memory and an operating system; initiating a system service on the standby compute node, wherein the system service is configured to start a sleep process or a power saving process of the standby compute node; and quiescing one or more devices in communication with the standby node.

In part, in another aspect, the disclosure relates to a method of performing a failover process in a fault tolerant computer system, wherein the computer system includes an active node and a standby node. The method may include deciding to perform a failover process; communicating that the failover process may be initiated to a platform driver of the standby node; preparing the standby node to receive information from the active node by activating a service on the standby node, wherein the service initiates a modified reboot process or shutdown process to quiesce one or more operations on the standby node; determining if a failover process was initiated; if the failover process was initiated, passing control of migration of information from active node to the standby node to the platform driver; and transferring state information from the active node to the standby node.

In various embodiments, the method may further include dismounting one or more file systems of the operating system of the active node. In some embodiments, the method may further include determining if a migration event was requested. In many embodiments, the method may further include if no migration event was requested, powering off the standby compute node or sending the standby node into a sleep state or a power save state. In some embodiments, the method may further include if no migration event was requested, rebooting the standby compute node.

In part, in yet another aspect, the disclosure relates to a method of preparing for a standby compute node for a migration event in a fault tolerant system. The method may include receiving a migration instruction at the standby compute node of the fault tolerant system, the standby compute node includes a processor, a memory and an operating system; requesting a shutdown or a reboot of the standby compute node using an intelligent platform management interface (IPMI); and quiescing one or more devices in communication with the standby node.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

A computer system that includes multiple compute nodes may be configured to operate as a fault tolerant system that supports various processes to achieve fault tolerant operation and various levels of uptime tailored for a particular use case or customer need. These fault tolerant supportive processes may include a live migration capability such as, for example, when a first compute node is failing or about to fail and a second compute node is available to take over for the first compute node. These fault tolerant supportive processes may include various fail over, migration, and smart exchange processes.

In some embodiments, a smart exchange or a smart exchange process is a process in which a first compute node that includes a processor, such as a CPU, and a memory have the processor state and memory state are migrated to an identical or substantially similar second compute node without disrupting the operation of the first compute node. The source computer system (first compute node) that has its state migrated is called the Active, and the destination computer (second compute node) may be identified as the Standby. Prior to the smart exchange the Standby is a full-featured computer with local file storage. During migration its devices must be safely quiesced to avoid corruption of storage or other mishap. This disclosure describes a process where the Standby's normal shutdown or reboot capabilities are leveraged to perform this quiescing process and generally prepare components of the Standby node for a migration of information or data such as memory pages and processor state data. In various embodiments, the Standby recipient computer system/computer node has a minimally modified standard operating system with no restraints on its operation until called upon to act in its role as migration recipient. The features and processes disclosed herein is advantageous because it avoids complex modifications to the Standby to support migration, failover, smart exchange, etc.

Applicant has discovered that preparing for migration causes the standby node to enter a quiesced state that corresponds to some (but not all) of the steps and changes associated with a device shutdown or reboot and as such those inherent or native features of the standby compute node can be leveraged or repurposed to support preparing the standby for migration. In various embodiments. Platform driver in the operating system of the standby governs quiescent state preparation in response to signal from active node. In various embodiments, a ram disk may also be configured and used at the standby node to support and perform some of the features, messaging, and other processes disclosed herein.

Figure 1:
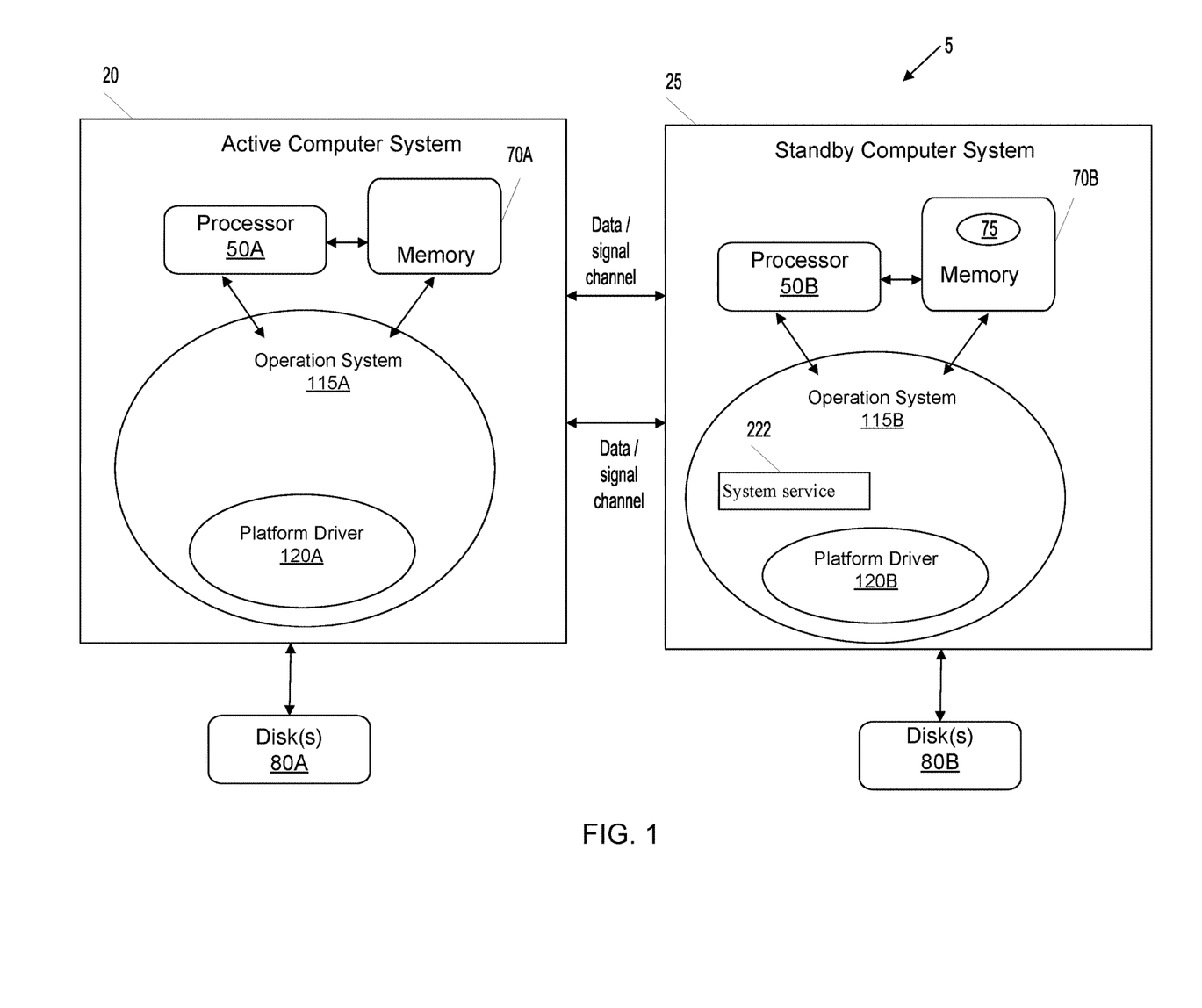
FIG. 1 is a schematic diagram of a fault tolerant system that include an active computer system and a standby computer system having a modified shutdown or reboot process configured to support a migration, failover, or other transfer of state information from the active computer system to the standby computer system according to an exemplary embodiment of the disclosure.

Refer now to the example embodiment of FIG. 1. FIG. 1 is a schematic diagram of a fault tolerant system 5 that include an active computer system (also referred to as a compute node) 20 and a standby computer system 25 having a modified shutdown or reboot process configured to support a migration, failover, or other transfer of state information from the active computer system to the standby computer system FIG. 1 depicts a computer system 25 that is part of a fault tolerant system that may include a second computer system 20 that is substantially the same as computer system 25. The computer systems 20, 25 may include various components such as processors 50A, 50B and memories 70A, 70B, such a random access memories, and communication or data exchange channels and buses shown by the various double headed arrows. The computer systems 20, 25 each include an operating system 115A, 115B with a platform driver 120A, 120B. The platform driver is configured to support and perform one or more of the steps/operations described herein.

In various embodiments, the operating system 115A, 115B runs or executes or exchanged threads or data with the processor 50A, 50B and stores and retrieves data from memory 70A, 70B such as random access memory and creates memory pages in such memory. The computer system 20, 20B may also include or connect to other memory storage such as disks or disk arrays 80A, 80B. Some of the disks may connects the computer system 20, 25 by being connected to a PCIe module a switch or a dedicated storage module. In various embodiments, a ram disk 75 may be generated in memory 70B of the standby node 25. The ram disk 75 may be used to perform various functions and processes as described in more detail herein. In general, the active node 20 and the standby node 25 are typically designed to have substantial the same or identify types of processors, memory, operating systems, etc. These nodes 20, 25 are designed and configured to be able to operate and perform the same tasks because when an active node fails and the standby node becomes the new active node, the original active node becomes the new standby node. In general, when a failure occurs in various nodes, the different nodes may need to take on the active or standby role under different circumstances.

Figure 2A:
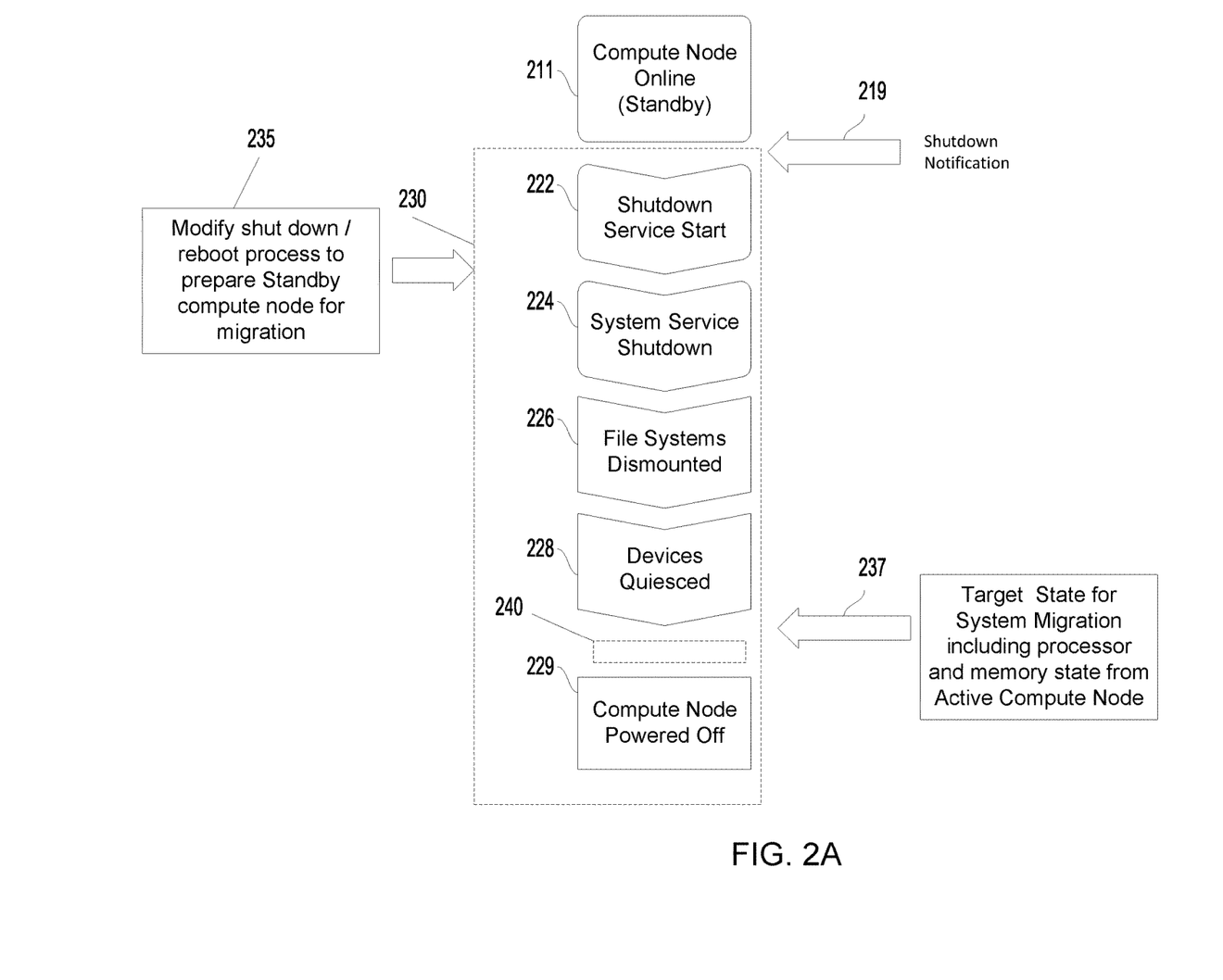
FIG. 2A is a flow chart depicting a normal shutdown process of a compute node according to an exemplary embodiment of the disclosure.

Refer now to the example embodiment of FIG. 2A. FIG. 2A is a flow chart depicting a shutdown process on a compute node/computer system. In various embodiments, a computer system such as fault tolerant computer system may include multiple compute nodes. Each compute node may include one or more processors, an associated memory, an operating system and other hardware and software components. The normal shutdown process begins with an online compute node 211 is issued a shutdown notification 219. In some embodiments, the shutdown notification on a Linux or Unix-like system may be the issuing of a 'reboot' command. In some embodiments, the compute node may start a shutdown service 222 that initiates various user space aspects of a normal shutdown process, culminating in a shutdown of all system services 224. File systems are dismounted 226 and devices quiesced 228. In some embodiments, the devices may be various IO devices such as disk storage, peripherals, network interfaces, etc. and other devices that are in communication with and used by the standby node. Once the devices have been quiesced, the standby node is in a prepared for migration state 237. This state 237 is a target state for system migration including processor and memory state from an active compute node.

In various embodiments, a fault tolerant computer system capable of a smart exchange failover process may implement a modified shutdown process on each of two compute nodes, wherein a final state of the shutdown process is not a powered off state but a state wherein the node is ready to accept a complete system state of a different node or otherwise prepared for a migration from another node such as an active node. In many embodiments, of the current disclosure, a reboot process may be considered to be a shutdown process, the only difference being the final state of the compute node (rebooting versus being powered off).

A computer system implementing a live migration capability such as smart exchange may modify one or more steps of the shutdown process of FIG. 2A such as by adding, changing, or removing steps (shown by modifications to steps and related software and firmware indicated by modification process 230 (also shown as a dotted box that includes various modifiable shut down or reboot steps applying step 235) and adding APIs and a platform driver that support such processes. These modifications 230 can change be implemented relative to the shutdown process such that the Standby/recipient system is a minimally modified standard operating system with no restraints on its operation until called upon to act in its role as migration, fail over or smart exchange recipient.

For example, as discussed in more detail herewith, once devices are quiesced in step 228 the standby computer node 211 may be modified by adding an intervening process or processes 240, for example, that may avoid the power off step 229 and instead, if a smart exchange or other migration/failover was requested, proceed with the state transfer and other step smart exchange steps such that a standby compute node can receive state information and take over for an active node. Various other intervening processes and modifications may be made to repurpose some of the standby node's shut down features to support a smart exchange or other similar processes. Some of these additional or modify steps are described relative to FIG. 2B such as decision 231 and steps 241, 251, and 252.

Figure 2B:
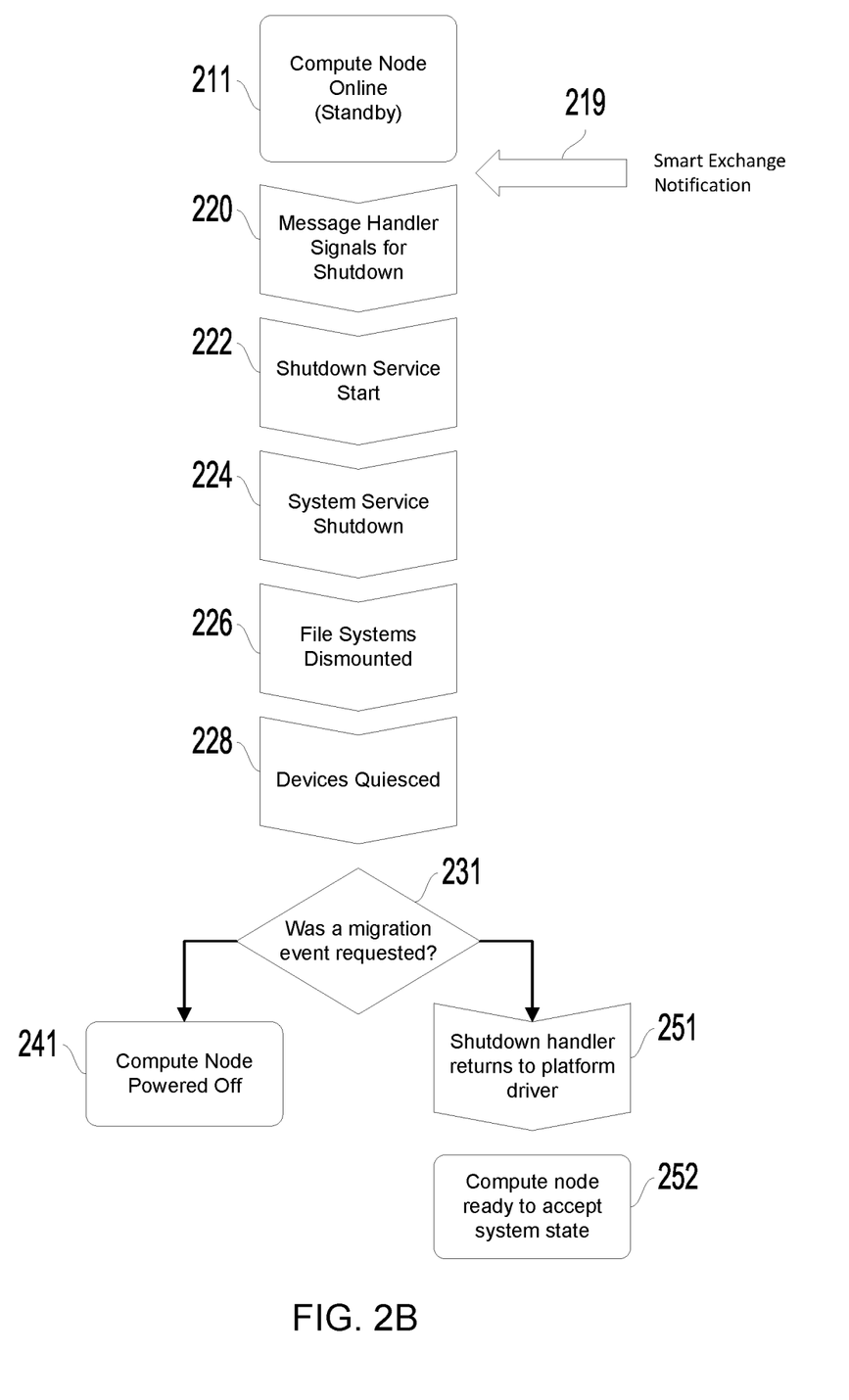
FIG. 2B is a flow chart depicting a modified shutdown process that prepares a compute node for a failover, migration, or other fault tolerant supportive process such as a smart exchange process according to an exemplary embodiment of the disclosure.

Refer now to the example embodiment of FIG. 2B. FIG. 2B is a flow chart depicting a modified shutdown process wherein a compute node such as standby node 25 is prepared as a recipient for a smart exchange failover procedure from an active node 20 according to an exemplary embodiment of the disclosure. In various embodiments, in a fault tolerant computer system, a first compute node (active node 20) that is active but failing or predicted to fail decides that a smart exchange failover process should occur and sends a smart exchange notification 219 to a second compute node (standby node 25, 211) in an online, standby state. A message handler on the second compute node 25 signals to begin the modified shutdown process 220, thereby beginning a process of readying the standby node 25 to act as a recipient in a smart exchange failover process from active node 20. In various embodiments, a notification may also be implemented as an instruction or other signal or data.

These alternative methods may include the active node explicitly requesting a shutdown of the standby node through IPMI or a platform driver in the OS, such as a kernel mode driver, may be used to invoke IPMI directly to start modified shutdown process 220. In some embodiments, an IPMI message is sent to the BMC and can arrive at the BMC via an internal bus (IPMB) or a network interface connected to the BMC. In some embodiment, the BMC command or message causes a process or service to execute on a compute node and that process or services may perform one or more of the steps or processes disclosed herein.

In various embodiments, referring to FIGS. 1 and 2B, a platform driver 120B of the operating system 115B may implement, initiate, or manage any portion of the modified shutdown process of standby node 25. The platform driver may be a kernel mode driver. Additionally, the platform driver may be a smart exchange driver configured to perform a fail over or migration process from one compute node to another compute node. In some embodiments, the platform driver 120B on the second compute node 25 activates a system service 222 that begins the modified shutdown process. In many embodiments, the system service may be written for and managed by a systemd service manager, an initrc service manager, an openrc service manager, or another init or system service manager in a Linux or Unix-like system. In many embodiments, the foregoing managers may control individual services that provide some essential function. One or more of the services that control may be initiated by various system and method embodiments because a given manager has received a notification of a shutdown/reboot operation.

In some embodiments, the system service may issue a 'reboot' command or 'shut down' command in a Linux or Unix-like operating system, which would otherwise initiate a normal system reboot or shutdown. In some embodiments, the shutdown/reboot notification is a state change that causes services to start operation or stop operation as defined by that service. In many embodiments, the shutdown service concludes 224, though the second compute node 25 executes smart exchange scripts later in the modified shutdown process. In some embodiments, as in a normal shutdown process, the second compute node 25 dismounts its file systems 226 and quiesces its attached devices 228. In other embodiments, the system service may also issue a 'sleep' or 'power save' command.

In many embodiments, having concluded normal reboot steps, the second compute node 225 executes a program or script 231 that determines if the reboot was initiated in response to a request for a migration event, such as for example a smart exchange request. In many embodiments, a smart exchange request may be initiated by the platform driver on the Active. In some embodiments, a smart exchange request may be sent by via a messaging protocol implemented by a PCIe switch, in other embodiments. The Active may initiate a smart exchange request by contacting a service application on the Standby through TCP or another networking protocol. In most embodiments, shutdown hooks related to a smart exchange process execute during every system shutdown or reboot, whether or not a smart exchange was initiated.

In such embodiments, these shutdown hooks make a query of the platform driver 120B via an IOCTL event and, if the platform driver identifies that the shutdown is due to a requested smart exchange that IOCTL event never returns. Instead, control is passed back to the platform driver and the migration finalization process occurs. If, however, no migration is in process, then the IOCTL event returns and the normal shutdown or reboot process finalizes. In some embodiments, the script interacts with the driver 120B via an application programmer interface (API). In most embodiments, a final state of the second compute node is a state wherein the node is ready to accept smart exchange data and state of the first compute node 20. In various embodiments, the scripts used to perform some of the preparation steps may include a shutdown handler or a reboot handler, but other identifiers may be used without limitation.

In some embodiments, the API may be a proc file system write or a messaging system API. The platform driver may be configured to register a data element or other stored data that looks like a file but interacting with it results in a call into the platform driver. The thread of control from the script leads directly into the driver. The driver may be interacted with from a script because it is exposed as a file in a virtual file system. Other operating systems implement other interfaces. IOCTLs on Linux/Unix are similar. Other operating systems may use a message-passing call that posts a message and blocks the thread. One CPU node or another CPU node picks up the message at some point to work the message queue.

In some embodiments, of the disclosure the implementation relies on the immediacy of the call because the relevant instruction is being sent right into the driver without other intervening steps or delay and migration work picks up from there.

In some embodiments, a method of preparing a compute node to serve as a recipient in a smart exchange process such as a live migration or fail over process may include a loading of a RAM disk 75 such as, for example, an 'initrd' (an initial RAM disk) or an 'initramfs' (initial RAM file system) during the modified shutdown process in a Linux or Unix-like operating system or other operating system. In other operating systems, other ram disk or ram disk-like temporary file systems and the associated tools to configure and modify them may be used to modify the shutdown or reboot process to prepare a standby node for migration.

A ramdisk may include a temporary file system used in the boot process of a kernel of an operating system and may comprise an 'initrd' or an 'initramfs'. In many embodiments, the ramdisk is used to perform some basic configurations or otherwise prepare or identify certain processes and resources before a root file system that will be used by an active compute node (node 25 after migration and taking on the new role of an active node) can be mounted.

In most embodiments, a smart exchange process expects a dismounted filesystem and quiesced storage devices on the active, a state which may be achieved by unloading an NVME storage drives. In some embodiments, a ramdisk, such as an 'initrd' or 'initramfs', or other compute node operating system service may remove device driver modules, such as an NVME storage driver, before the platform driver receives control of the modified shutdown process 251. In other embodiments, a notification from the platform driver may use hooks in an NVME driver to quiesce all storage operations, thereby obviating a modified NVME driver as a design requirement. In still other embodiments, device quiesce operations on the Active 20 may extend into the platform driver on the Standby 25 without unloading an NVME driver.

In various embodiments, an initramfs may be prepared by or may utilize dracut software in a Linux or Unix-like operating system or other RAM disk configuration tools. In some embodiments, an initramfs and the dracut software provides the Active an ability to unmount a live file system and storage devices without unload various system drivers or the platform driver.

In other embodiments, rather than executing a system service 222 that invokes a 'reboot' command, the first, active compute node 20 may request a shutdown of the second compute node 25 via an intelligent platform management interface (IPMI). In still other embodiments, the platform driver on the second compute node 25 may invoke a reboot directly via an IPMI transaction. In embodiments, wherein the second compute node does not host a Linux or Unix-like operating system, a method of preparing a compute node to serve as a recipient in a smart exchange process may initiate a reboot, execute shutdown services, or interact with a platform driver by other mechanisms, scripts, or processes. In most embodiments, a shutdown process or a reboot comprises a sequence of hooks executed in a pre-defined order, and in some embodiments, a step of the method wherein devices are quiesced may be layered as an aspect of the system shutdown or reboot sequence. For some systems, a customized Linux distribution or kernel may be used to allow the shutdown/reboot process to be controlled or leveraged to prepare a compute node for a migration event such as a smart exchange, migration, live migration, fail over or similar transfer of information from a failing node.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding" or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments, of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of preparing for a standby compute node for a migration event in a fault tolerant system, the method comprising:
    receiving a migration instruction at the standby compute node of the fault tolerant system, the standby compute node comprising a processor, a memory and an operating system;
    initiating a system service on the standby compute node, wherein the system service is configured to start a shutdown or a reboot process of the standby compute node; and
    quiescing one or more devices in communication with the standby node.

2. The method of claim 1 further comprising dismounting one or more file systems of the operating system.

3. The method of claim 1 further comprising determining if a migration event was requested.

4. The method of claim 3 further comprising if no migration event was requested, powering off the standby compute node or sending the standby compute node into a sleep state or a power save state.

5. The method of claim 3 further comprising if no migration event was requested, rebooting the standby compute node.

6. The method of claim 3, wherein the operating system comprises a platform driver configured to initiate the system service in response to the received migration instruction.

7. The method of claim 6, wherein the system service is selected from the group consisting of systemd service; an initrc service; an openrc service, an init service; a Linux-based system service, a Unix-based system service, a Windows-based system service, and a real-time operating system service.

8. The method of claim 6 further comprising if a migration event is determined to have been requested, assigning control of migration process to the platform driver.

9. The method of claim 8, wherein determining if a migration event was requested is performed using a script or other software-based process.

10. The method of claim 1, wherein the migration notification is sent from a failing active compute node of the fault tolerant system.

11. The method of claim 8 further comprising creating a system state wherein file systems are unmounted via a RAM disk.

12. The method of claim 11, wherein the RAM disk is configured to remove one or more device drivers or other software components of the standby node before control of migration process at the standby compute node is assigned to the platform driver.

13. The method of claim 11, wherein initiating a system service comprises issuing a first command to a kernel of the operating system or to a system service manager, wherein the first command is a shut down or reboot command.

14. A method of preparing for a standby compute node for a migration event in a fault tolerant system, the method comprising:
    receiving a migration instruction at the standby compute node of the fault tolerant system, the standby compute node comprising a processor, a memory and an operating system;
    initiating a system service on the standby compute node, wherein the system service is configured to start a sleep process or a power saving process of the standby compute node; and
    quiescing one or more devices in communication with the standby node.

15. A method of performing a failover process in a fault tolerant computer system, wherein the computer system comprises an active node and a standby node, the method comprising:
    deciding to perform a failover process;
    communicating that the failover process may be initiated to a platform driver of the standby node;
    preparing the standby node to receive information from the active node by activating a service on the standby node, wherein the service initiates a modified reboot process or shutdown process to quiesce one or more operations on the standby node;
    determining if a failover process was initiated;
    if the failover process was initiated, passing control of migration of information from active node to the standby node to the platform driver; and
    transferring state information from the active node to the standby node.

16. The method of claim 15 further comprising dismounting one or more file systems of an operating system of the active node.

17. The method of claim 15 further comprising determining if a migration event was requested.

18. The method of claim 17 further comprising if no migration event was requested, powering off the standby compute node or sending the standby node into a sleep state or a power save state.

19. The method of claim 17 further comprising if no migration event was requested, rebooting the standby compute node.

20. A method of preparing for a standby compute node for a migration event in a fault tolerant system, the method comprising:
    receiving a migration instruction at the standby compute node of the fault tolerant system, the standby compute node comprising a processor, a memory and an operating system;
    requesting a shutdown or a reboot of the standby compute node using an intelligent platform management interface (IPMI); and
    quiescing one or more devices in communication with the standby node.

* * * * *